United States Patent Office 3,629,324
Patented Dec. 21, 1971

3,629,324
PERFLUORO ALIPHATIC ESTERS
Milton B. Frankel, Tarzana, and Naomi N. Ogimachi, Canoga Park, Calif., assignors to the United States of America as represented by the Secretary of the Air Force
No Drawing. Filed May 8, 1969, Ser. No. 826,056
Int. Cl. C07c 69/34
U.S. Cl. 260—485 F                                 3 Claims

ABSTRACT OF THE DISCLOSURE

Esters produced by the condensation of 2,2-dinitro-2-fluoroethanol with perfluoro aliphatic dibasic acids in the presence of an inert organic solvent and an acid catalyst. The novel group of esters prepared by the above reaction find utility as plasticizers for explosive compositions of matter. Also, the esters of this invention are useful as explosives per se.

BACKGROUND OF THE INVENTION (1) Field of the invention

This invention is in the field of organic esters.

(2) Description of the prior art

The production of an ester by the reaction, in an inert solvent, of an acid with an alcohol is well known. However, there has been a need, in the explosives industry, for energetic, thermally stable, dense liquids for use as plasticizers. The esters of this invention are such liquids at room temperature and, to the inventors' knowledge, have never been prepared before.

Of course, any compounds which are themselves explosive will always be useful in the explosives arts. The compounds of this invention are such compounds.

SUMMARY OF THE INVENTION

The esters prepared by this invention have the general formula:

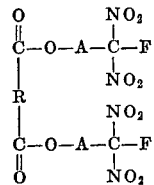

where A is selected from the group consisting of straight or branched lower alkylene radicals and wherein R is selected from the group consisting of $(CF_2)_n$ wherein $n$ is 1 to 4 inclusive. In the above general formula, the two A's may be the same or different.

DESCRIPTION OF THE PREFERRED EMBODIMENT

The esters of this invention may, for convenience, be depicted as $R[CO_2AC(NO_2)_2F]_2$ wherein A and R are the same as set forth above. The esters are prepared by the following general reaction:

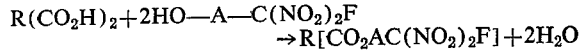

Again, A and R are the same as set forth above. The esterifications are carried out by refluxing the acid and the alcohol in the presence of an inert organic solvent and a suitable catalyst. The water formed is azeotropically removed.

The following are specific examples of how some of the novel plasticizers were prepared in this laboratory.

Example I.—Difluoromalonic acid (11.9 grams) and 2,2-dinitro-2-fluoro ethanol (28.5 grams) were dissolved in 150 ml. of benzene and the resulting solution was placed in a 500 ml. flask fitted with a magnetic stirrer, a Dean and Stark trap, and a reflux condenser. The solution was stirred and refluxed for 124 hours during which time 1.8 ml. of water was collected in the Dean and Stark trap. After 124 hours, the mixture was treated with decolorizing carbon and allowed to cool. The solution was filtered and the benzene solvent removed under reduced pressure. The residual liquid was distilled twice to yield 16.31 grams (46.5% yield) of bis(2,2-dinitro-2-fluoroethyl)difluoromalonate which had a boiling point of 131.5–132.5° C./0.55 mm. and a melting point of less than −21° C.

Analysis.—Percent calculated for $C_7H_4F_4N_4O_{12}$: carbon 20.40; hydrogen 0.98; nitrogen 13.59. Found (percent): carbon 20.57; hydrogen 1.19; nitrogen 12.83.

Example II.—Perfluorosuccinic acid (5 grams), 2,2-dinitro-2-fluoroethanol (8.5 grams), and 50 ml. of benzene were placed in a 100 ml. flask fitted with magnetic stirrer, Dean and Stark trap, and a reflux condenser. Approximately 0.2 ml. of concentrated sulfuric acid was added and the mixture refluxed for 80 hours at which time no more water was given off by the reaction. Additional 0.2 ml. quantities of sulfuric acid were added after 16, 24, and 48 hours of refluxing. Total water collected in the Dean and Stark trap was 1.1 ml. The mixture was allowed to cool and washed with three 50 ml. portions of 5% aqueous $NaHCO_3$ and two 50 ml. portions of water. The resulting light yellow solution was dried over $MgSO_4$ and the solvent removed under reduced pressure. The remaining liquid was distilled to give 1.43 grams (12% yield) of bis(2,2-dinitro-2-fluoroethyl)tetrafluorosuccinate having a boiling point of 112–114° C./0.005 mm. and a melting point of 46–47° C.

Analysis.—Percent calculated for $C_8H_4F_2N_4O_{12}$: carbon 20.79; hydrogen 0.87; nitrogen 12.12. Found (percent): carbon 21.13; hydrogen 1.33; nitrogen 11.61.

Other acids which may be used in lieu of the ones disclosed in the examples above are hexafluoroglutaric acid and octafluoroadipic acid. Other alcohols which may be used in lieu of the 2,2-dinitro-2-fluoroethanol above include the saturated, straight or branched chain alcohols of the type shown in the general reaction above wherein A consists of a chain of 2, 3, 4, 5, 6, or 7 carbon atoms. Catalysts which may be used in lieu of the sulfuric acid of Example II include polyphosphoric acid and p-toluenesulfonic acid. The amount of catalyst used can vary according to the desired reaction rate and may range from trace amounts to stoichiometric amounts. Solvents which may be used in lieu of the benzene of Examples I and II include toluene, chlorobenzene, chloroform, carbon tetrachloride, and ethylene dichloride.

The 2-2-dinitro-2-fluoroethanol used in the above examples may be easily prepared by the reaction of fluorine with 2,2-dinitroethanol in basic solution.

The novel compounds of this invention were tested by a standard explosive evaluation test to demonstrate the unexpected results of the invention. The test conducted was the vacuum thermal stability test which is well known to those skilled in the explosive arts. Bis(2,2-dinitro-2-fluoroethyl) difluoromalonate had a vacuum thermal stability (ml. gas evolved per gram at 150° C.) of 0.530/2 hours. This compound has a detonation pressure of 246 Kbar as compared to 206 Kbar for TNT.

We claim:
1. The family of compounds having the general formula:

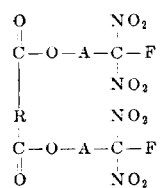

wherein A is selected from the group consisting of straight and branched chain alkylenes having 1, 2, 3, 4, 5, 6, and 7 carbon atoms and wherein R is selected from the group consisting of $(CF_2)_n$ wherein $n$ is 1 to 4 inclusive.

2. The compound according to claim 1 wherein A is $CH_2$ and R is $CF_2$.
3. The compound according to claim 1 wherein A is $CH_2$ and R is $C_2F_4$.

References Cited

UNITED STATES PATENTS 3,062,879  11/1962  Drysdale _____ 260—485 F

LELAND A. SEBASTIAN, Primary Examiner

U.S. Cl. X.R.

149—88